United States Patent [19]

Lehocki

[11] Patent Number: 4,845,602
[45] Date of Patent: Jul. 4, 1989

[54] COMBINATION PLANT HOLDER AND LIGHT GLOBE

[76] Inventor: Stephen C. Lehocki, 5050 Eighth St., Cecil Field, Jacksonville, Fla. 32215

[21] Appl. No.: 209,974

[22] Filed: Jun. 23, 1988

[51] Int. Cl.⁴ .............................................. F21V 33/00
[52] U.S. Cl. ..................................... 362/122; 362/96; 362/805; 47/67
[58] Field of Search ................. 362/96, 122, 154, 805, 362/806; 47/67, 86

[56] References Cited

U.S. PATENT DOCUMENTS

| 3,030,735 | 4/1962 | Bodkins | 362/154 |
| 4,349,864 | 9/1982 | Smith | 362/805 |
| 4,626,968 | 12/1986 | Von Kohorn | 362/122 |
| 4,714,985 | 12/1987 | Hickey | 362/154 |

Primary Examiner—Ira S. Lazarus
Assistant Examiner—David G. Messer

[57] ABSTRACT

A vessel adapted to hold a plant and to serve as a light globe facing downwardly; the vessel having an open top and a closed bottom to define a toroidal volume to hold the plant, a central recess opening from the bottom of the vessel and extending upwardly, a light bulb socket at the upper end of the recess, and optionally, vents in the bottom of the vessel and a ring shaped cover for the vents spaced downwardly from the closed bottom.

12 Claims, 2 Drawing Sheets

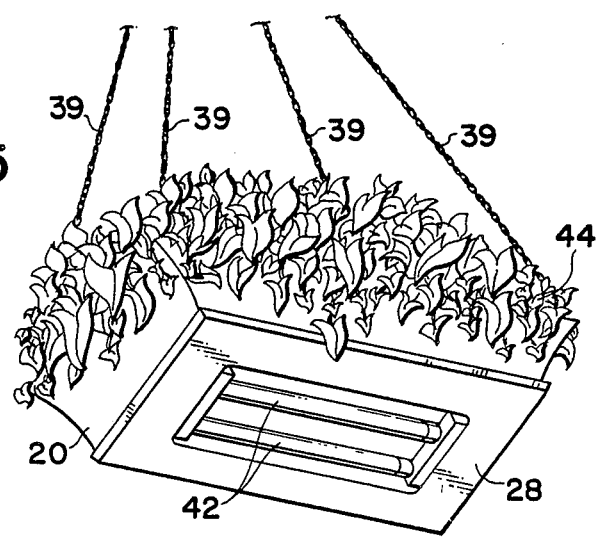
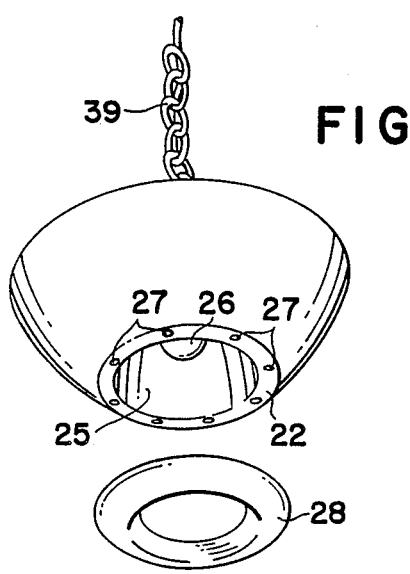
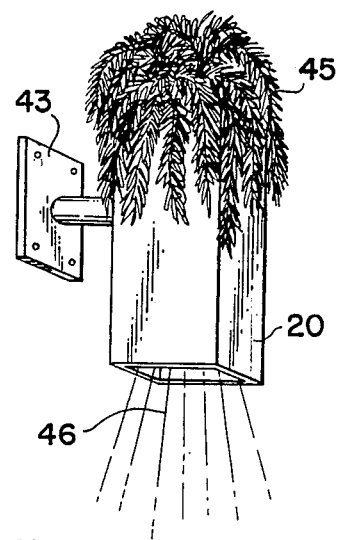
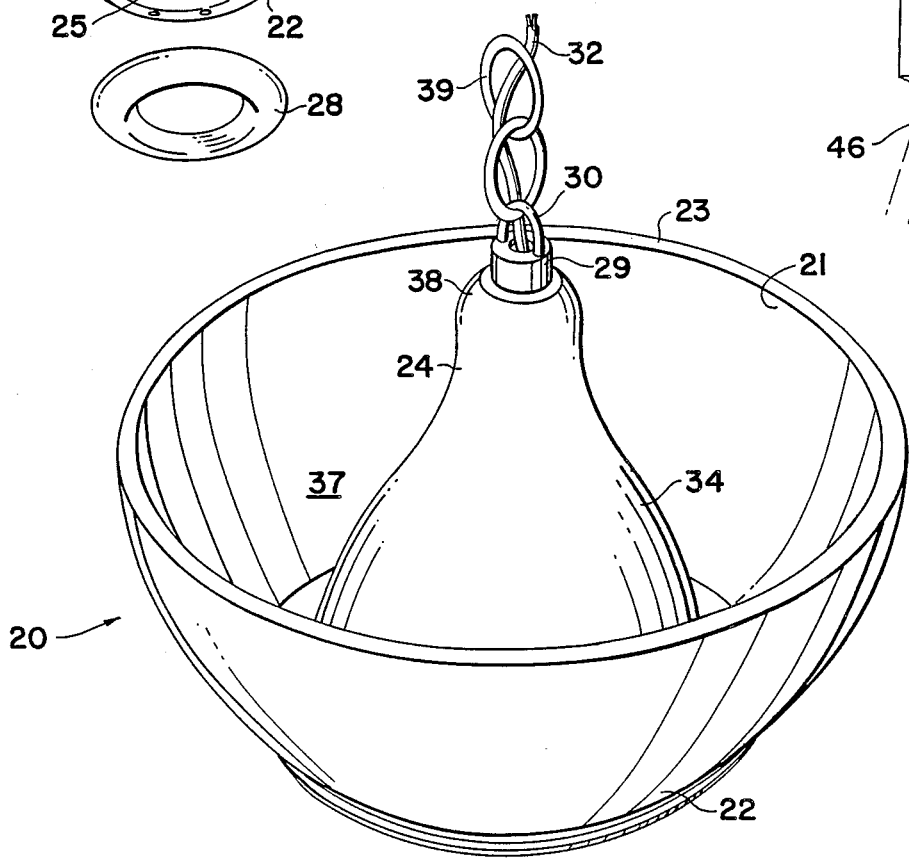

COMBINATION PLANT HOLDER AND LIGHT GLOBE

BACKGROUND OF THE INVENTION

Hanging baskets for plants or flowers are well known articles of decoration. Overhead light fixtures and wall fixtures with downwardly shining light are also well known illuminating devices. Insofar as is known, the two functions of plant holder and light globe have never been combined into a single article of manufacture where there is a downwardly shining light, although the mere thought of such a combination would probably be considered highly desirable by most persons who enjoy having plant life around them.

The only combined plant holder and lamp that is known is U.S. Design Pat. No. 247,356 to Wright, but this is merely a floor standing ornamental structure not an overhead light as comprehended in the present invention.

It is an object of this invention to provide a novel plant holder. It is another object of this invention to provide a novel light globe. It is still another object of this invention to provide a fixture that both serves as a hanging plant holder or a wall attached plant holder and as a light globe. Still other objects will become apparent from the more detailed description which follows.

BRIEF SUMMARY OF THE INVENTION

This invention relates to a combination plant holder and light globe comprising a vessel having a closed bottom, an open top, and a centrally located recess in the closed bottom extending upwardly into the central interior of the vessel to define a toroidal space opening upwardly and closed downwardly, said vessel being adapted to contain an earth growing plant therein in the toroidal interior of the vessel; said recess at its top including an electric light bulb fixture and being adapted to form an encircling globe for an electric light bulb.

In a preferred embodiment of the invention the vessel has a plurality of spaced vents around its closed bottom and a ring-shaped drip catcher is spaced downwardly from the closed bottom to catch any water coming out of the vents. In another preferred embodiment the globe portion of the article has a layer of heat insulation adjacent the lamp to protect against heat buildup in the plant.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view looking downward into the plant holder of this invention;

FIG. 2 is an exploded perspective view looking upward into the light globe of this invention;

FIG. 5 is a perspective view of a plant holder employing fluorescent light bulbs; and FIG. 6 is a perspective view of a plant holder attached to a vertical wall.

DETAILED DESCRIPTION OF THE INVENTION

Figure 3:
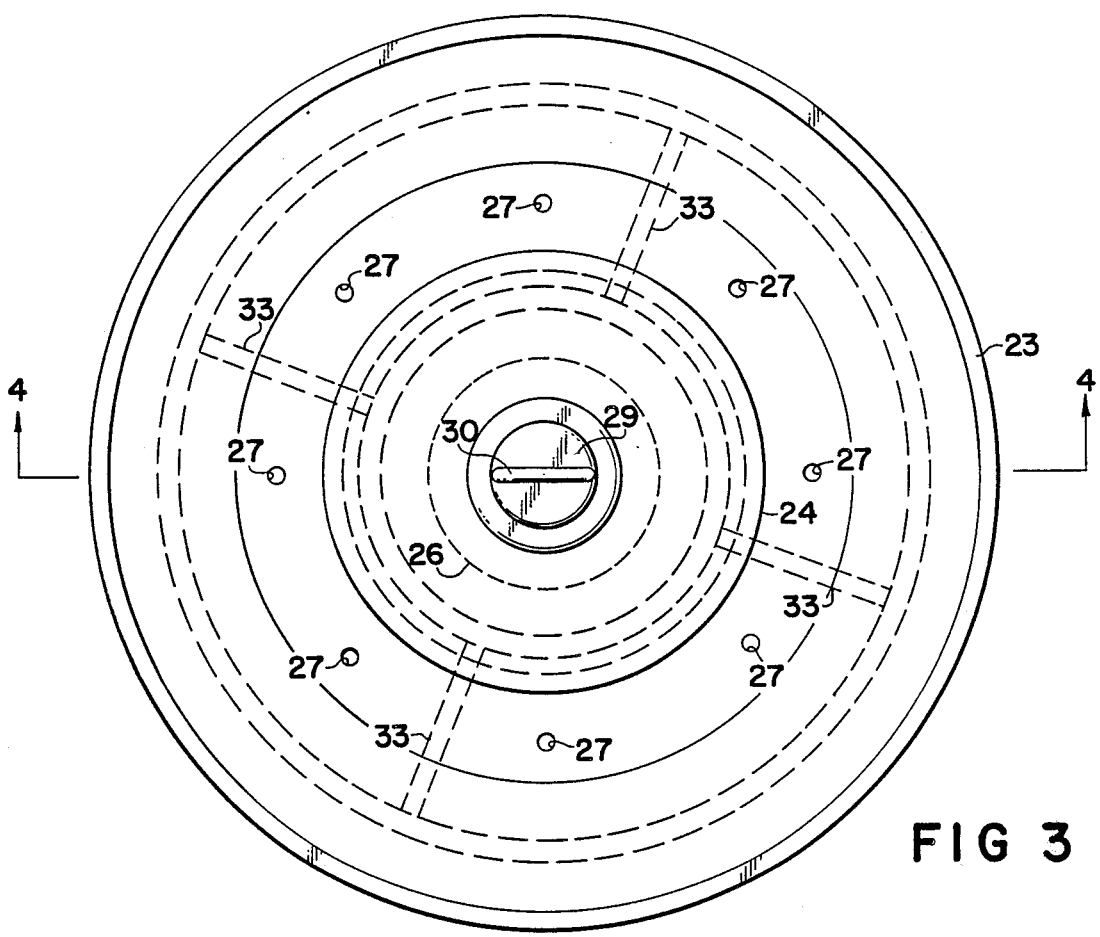
FIG. 3 is a top plan view of the combination of this invention.
Figure 4:
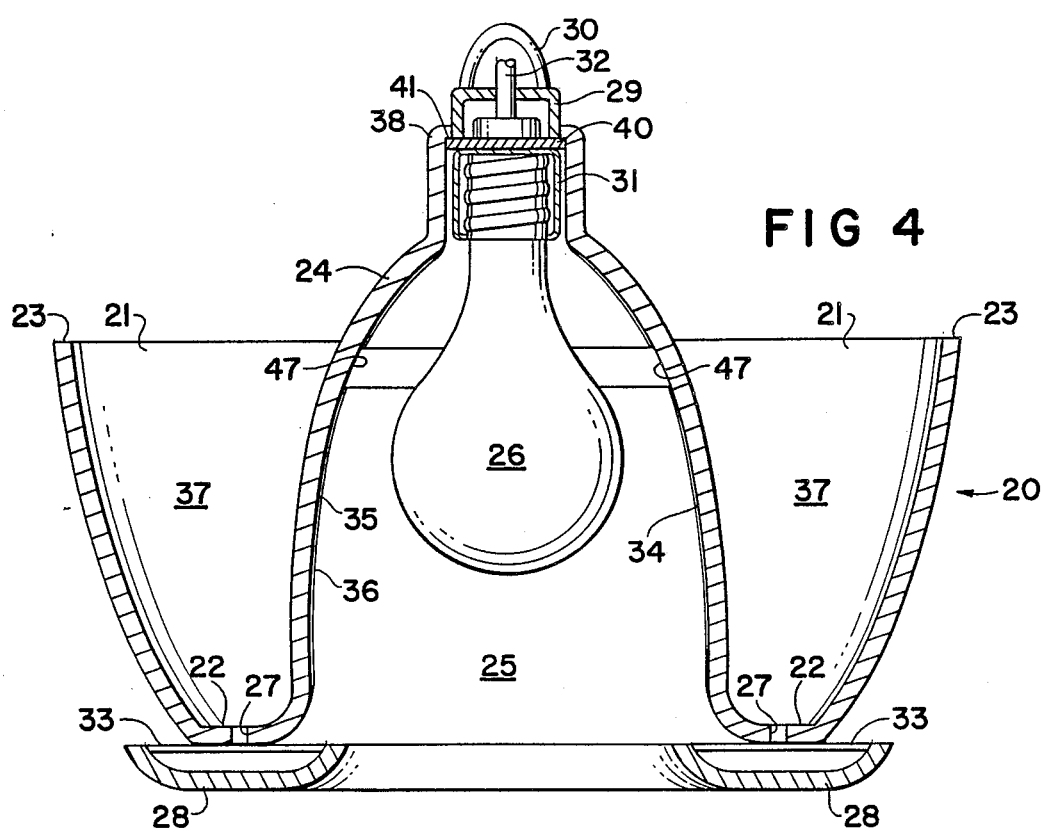
FIG. 4 is a cross sectional view taken at 4—4 of FIG. 3.

The features of this invention can best be appreciated by reference to FIGS. 1-4 of the attached drawings.

In general, the invention is a bowl-shaped vessel 20 having an open top 21, a closed bottom 22, and upper rim 23, and a central conical projection 24 extending upward from the closed bottom 22 to the top 38 of the structure 24 above the upper rim 23. The volume 37 between the outer walls of vessel 20 and the walls of projection 24 form a toroidal space for holding a plant, e.g., ivy which can hang over rim 23 and downward as far as is desirable.

The inside of projecting structure 24 is a recess 25 with a large opening to adjacent closed bottom 22 and a small opening at upper end 38. In this recess 25 is placed a light bulb to shine its light downward. In general, it is preferred that light globe wall 34 have a reflective surface 36 and that a layer 35 of heat insulation material be applied to wall 34 to prevent any excessive heat buildup in wall 34 that might damage the plant in space 37. Insulation layer 35 should be next to wall 34 and reflective layer 36 on the outside of insulation layer 35.

Preferably, vessel 20 is hung from an overhead support, such as a chain 39. In order to make such a support safe, it is recommended that the bottom link of the chain 39 be attached to an adapter 29 having a half link 30 welded thereto. Adapter 29 may also have rigidly affixed to its lower surface a light socket 31 adapted to receive the screw threads of a light bulb 26. Adapter 29 may be fitted with a lateral ledge 40 extending radially outward to receive a corresponding inward projecting ledge 41 on upper end 38 of projection 24. It should be recognized that there may be other connecting means for hanging vessel 20 from chain 39, e.g., by screw thread connection to permit vessel 20 with its plant to be removed from socket 31 and bulb 26 for cleaning, watering, fertilizing, or the like. A splined connection could also be used whereby vessel 20 could be turned with respect to adapter 29 until the lands in vessel 20 can slide vertically through the grooves in adapter 29 to separate the two. A "splined connection" is one involving two contacting surfaces, usually both being cylindrical, wherein each surface is machined to produce a plurality of spaced parallel grooves separated by a plurality of spaced parallel lands; the lands of one surface slidably fitting into the grooves of the other surface.

In preferred structure closed bottom 22 is punctured with a plurality of vents 27 passing through the wall of bottom 22 to permit excess water to drain away from the plant roots. To accommodate the drippage, a ring cover 28 is suspended slightly below vents 27. Cover 28 should be attached to vessel by any suitable means including screws, bolts, hooks, etc. In the embodiment shown in FIGS. 3 and 4, strips 33 extend across the top of cover 28 at several spaced locations and are adhesively attached to the outside of bottom 22. Heat welding or an additive glue may be employed for such a purpose.

An optional feature is to include a transparent ring opening 47 to permit light from bulb 26 to shine through and illuminate the plant from the interior. Interesting light effects can be produced in this fashion. This can be accomplished by merely eliminating coatings 35 and 36 at the general location desired, when the vessel is made of transparent plastic. If the vessel is made of opaque material, a passageway can be cut through the wall at this location and covered by transparent plastic film, sheet, or glass.

In FIG. 5 there is shown another embodiment of this invention. Vessel 20 is generally rectangular in shape, and ring cover 28 is also rectangular in order to catch dripping from vents in the closed bottom of vessel 20. Recess 25 is also rectangular in order to accommodate two fluorescent light bulbs 42 as the light source. Plant 44 is in the toroidal interior of vessel 20, which is suspended from above by chains 39. It is, of course, entirely acceptable to form vessel 20 into any shape, whether it be curved or angular, so long as it can accommodate a central structure 24 for a lamp globe. The vessel may be rectangular and central structure 24 be a smoothly contoured conical arrangement; or vice versa, the outer vessel 20 may be curved as circular, elliptical, or the like, while the recess 25 is angular, as rectangular, triangular, star shaped, or the like.

In FIG. 6 there is shown a combination plant holder and light globe which has a plant 45 growing out of the upper open end of vessel 20, and a recess 25 for a light bulb at the bottom of vessel 20. In this instance the combination is affixed to a vertical wall by bracket 43 instead of being suspended from chains. Light 46 shines downward from this design as it does in all others of this invention. There is no cover 28 in this design. In place thereof a small plastic pot to hold the plant and to contain the water drippage may be used to fit into the open top of vessel 20.

It will be appreciated that vessel 20 may be molded in plastic as a single one-piece article, or it may be fabricated by fastening various preshaped parts to each other. Vessel 20 may be made of metal, wood, plastic, glass, or a woven basket construction (if a suitable water proof liner is also employed).

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A combination plant holder and light globe comprising a vessel having a closed bottom, an open top and a recess opening generally in the center of said bottom and projecting upwardly to a closed top to define a toroidal space opening upwardly and closed downwardly, said vessel being adapted to contain an earth growing plant therein in the toroidal interior of the vessel; said recess at its closed top including a fixture for receiving an electric lamp bulb, and said recess being adapted to form an encircling globe for the electric lamp bulb.

2. The combination of claim 1 wherein said closed bottom includes a plurality of spaced vents through a wall defining said bottom, said combination additionally including a ring-shaped cover spaced downwardly from and adjacent to said closed bottom.

3. The combination of claim 1 wherein said vessel is generally in the shape of a circular dish, and said structure is generally conical with the large end of the cone at said closed bottom.

4. The combination of claim 1 wherein said upwardly projecting structure has a thin wall with an outer surface facing said toroidal interior and an inside surface defining said recess, said inside surface including a heat insulating layer and a light reflecting layer.

5. The combination of claim 1 wherein the upper extremity of said projecting structure includes means for suspending . said combination from an overhead support.

6. The combination of claim 1 which additionally includes a side arm extending laterally outwardly from said vessel and is adapted to be fastened to a vertical wall.

7. The combination of claim 1 wherein said lamp bulb is a fluorescent light bulb.

8. The combination of claim 1 wherein said lamp bulb is an incandescent light bulb.

9. A combination plate holder and light globe generally symmetrical about its vertical axis, comprising a dish-shaped vessel having a closed bottom, an open top, and a perimeter rim around said open top; a generally truncated conical hollow structure extending vertically upward about said axis from said closed bottom to a truncated upper end located above said rim, a socket to receive an incandescent light bulb in said truncated upper end, said conical hollow structure defining a recess with an opening thereinto from the outside of said closed bottom; vents spaced around said closed bottom to provide passageways through said closed bottom; a ring-shaped trough speed downwardly from said closed bottom and adapted to catch anything falling from said vents; and a fastening means at said truncated upper end for attaching said vessel to and suspending it from a downwardly hanging electric light fixture; the interior space of said dish-shaped vessel being adapted to hold a living plant.

10. The combination of claim 9 wherein a portion of said hollow structure is transparent to light so as to provide illumination of said plant.

11. The combination of claim 9 wherein the interior surface of said hollow structure is coated with a reflective surface.

12. The combination of claim 9 wherein the said hollow structure between said light bulb and the interior of said dish-shaped vessel includes a layer of heat insulation.

* * * * *

UNITED STATES PATENT AND TRADEMARK OFFICE
CERTIFICATE OF CORRECTION

PATENT NO.   : 4,845,602
DATED        : July 4, 1989
INVENTOR(S)  : Stephen C. Lehocki It is certified that error appears in the above-identified patent and that said Letters Patent is hereby corrected as shown below:

Column 4, line 30, delete "plate" and insert --plant--

Signed and Sealed this

Fourteenth Day of August, 1990

*Attest:*

HARRY F. MANBECK, JR.

*Attesting Officer*   *Commissioner of Patents and Trademarks*